United States Patent [19]

Ragiab

[11] Patent Number: 4,653,706
[45] Date of Patent: Mar. 31, 1987

[54] EMERGENCY AIRCAFT LANDING DEVICE

[76] Inventor: Youssef Ragiab, 7516 McArdle, Apt. 242, Corpus Christi, Tex. 78412

[21] Appl. No.: 760,102

[22] Filed: Jul. 29, 1985

[51] Int. Cl.$^4$ .............................................. B64F 1/00
[52] U.S. Cl. ............................. 244/110 E; 244/114 R; 405/1; 405/211; 280/414.1; 114/262
[58] Field of Search ........... 244/110 E, 110 R, 114 R, 244/110 L, 110 F, 116; 114/262; 405/1, 211; 280/414.1; 410/119, 125, 94, 77, 156; 256/1

[56] References Cited

U.S. PATENT DOCUMENTS

| | | | |
|---|---|---|---|
| 1,558,130 | 10/1925 | Westcoff | 244/110 E |
| 2,380,105 | 7/1945 | Gerrard | 244/110 E |
| 2,896,564 | 7/1959 | Wright | 405/1 |
| 3,039,629 | 6/1962 | Cole | 280/414.1 |
| 3,128,066 | 4/1964 | Bailey | 244/110 E |
| 3,210,029 | 10/1965 | Brusch et al. | 244/114 R |
| 3,503,357 | 3/1970 | Ferris | 114/262 |
| 3,567,159 | 3/1971 | Klein | 244/114 R |

FOREIGN PATENT DOCUMENTS

| | | | |
|---|---|---|---|
| 592717 | 2/1960 | Canada | 244/114 R |
| 648853 | 8/1928 | France | 244/114 R |

*Primary Examiner*—Galen Barefoot
*Attorney, Agent, or Firm*—Charles D. Gunter, Jr.

[57] ABSTRACT

An emergency aircraft landing device is shown of the type having a base with a concave upper surface for receiving and supporting the fuselage of an aircraft. A plurality of resilient, elongate members are arranged in rows at spaced intervals along the upper surface and the rows are oriented normal to the upper surface for stopping the forward progress of an aircraft landing on the upper surface. An inflatable bag on either side of each of the rows supports the elongate members normal to the plane of the upper surface. The base is mounted on wheels and is powered by an electric motor for moving down a runway. A second electric motor is remotely controlled by a radio signal and operates a worm gear to position the front wheel of the device control the direction of travel.

8 Claims, 9 Drawing Figures

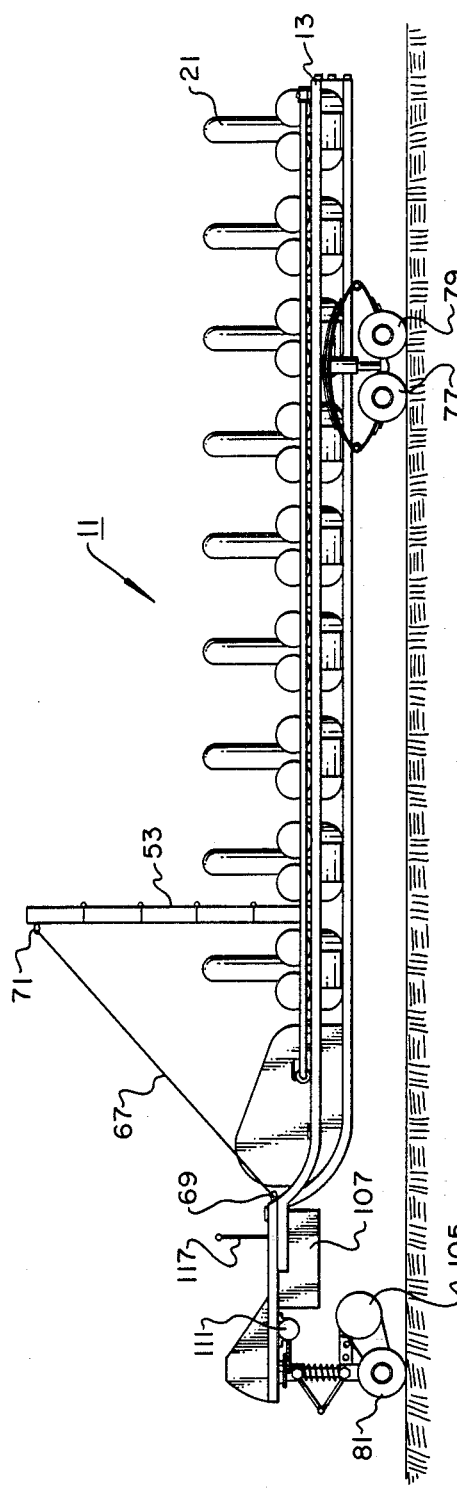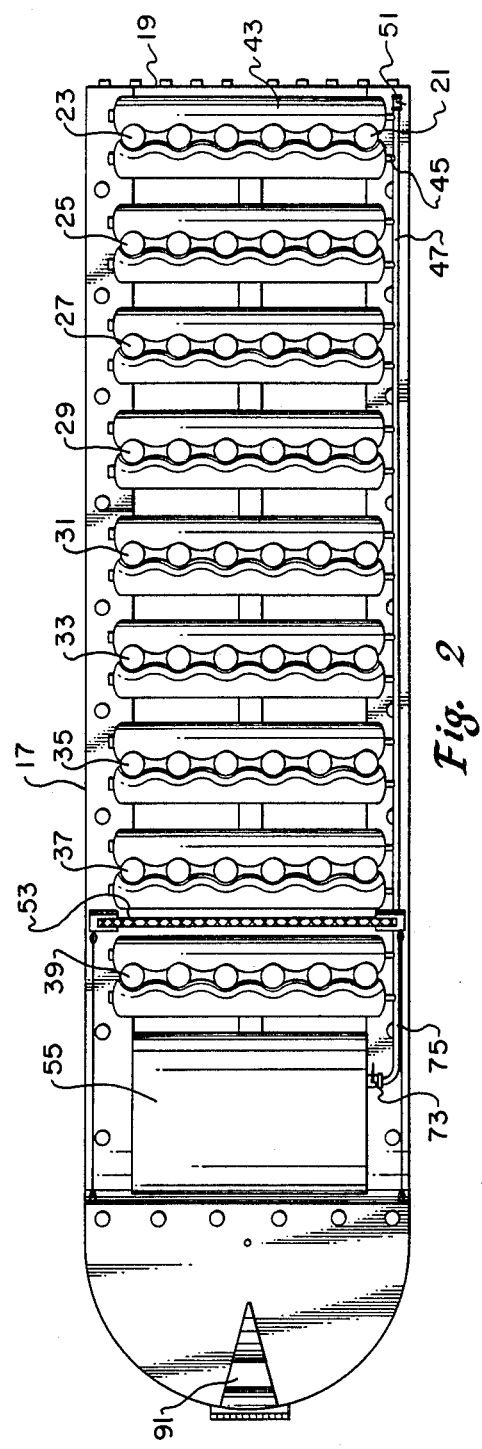

EMERGENCY AIRCAFT LANDING DEVICE

BACKGROUND OF THE INVENTION

1. Field of the Invention

The present invention relates to emergency landing devices for airplanes intended to lessen the danger of emergency landing and, specifically, to a mobile base adapted to be driven along an aircraft landing strip to intercept and support an aircraft descending toward the strip during landing.

2. Description of the Prior Art

At times, emergency aircraft landings are required where the landing gear or undercarriage is inoperative and retained in a retracted position. This is sometimes referred to as "belly landing." Such landings cause considerable damage to the airplane, with attendant dangers for the passengers and crew. These dangers are caused partly by the extensive damage to the airplane fuselage which occurs as the airplane contacts the runway, but also due to sparks being produced by the aircraft sliding down the runway. Since gasoline or jet fuel is often spilled in an emergency landing, such sparks present a great hazard to the passengers and crew.

Various devices have been suggested to minimize the risk of emergency landings of this type. For instance, early attempts included tensioning wire or nets which were strung across the runway to receive the airplane nose section and thereby shortening the landing path. However, such techniques create a great shock or impact upon the airplane which is likely to cause extensive damage.

Another technique is to apply a carpet of foam to the airport runway. This technique lessens the danger of a fire or explosion, but extensive damage to the aircraft cannot be avoided and such a foam carpet is expensive and can only be used once. After use of the foam, it must be removed by washing down the runway, which causes a shut down in air traffic for a number of hours.

Other devices have been suggested which incorporate a movable bed or base for intercepting and receiving a landing aircraft. The prior art devices have all suffered from various disadvantages. For instance, certain of the prior art devices required specially constructed roller systems or conveyors supplied by a dedicated runway. Other of the devices did not provide a sufficient landing area or means to effectively limit the forward travel of the aircraft upon contact. Also, certain of the prior art devices failed to adequately take into account the problem of sparks being generated upon contact with the aircraft.

These and other disadvantages are overcome by the landing device of the invention, as will be apparent in the written description which follows.

SUMMARY OF THE INVENTION

An emergency aircraft landing device is shown which includes a base having a concave upper surface and length which is greater than its width for receiving and supporting the fuselage of an aircraft. A plurality of resilient, elongate members are arranged in rows at spaced intervals along the upper surface. The rows are oriented normal to the length of the upper surface for stopping the forward progress of an aircraft landing on the upper surface. An inflatable support means on either side of each of the rows of elongate members supports the members perpendicular to the plane of the upper surface. Wheels are mounted on the base for allowing the base to roll down an airport runway and a propulsion means is provided for propelling the device to an appropriate speed for receiving the incoming aircraft.

Preferably the resilient, elongate members are solid, elastomeric fingers which are pivotally mounted on the base. Valve means are also provided for collapsing the inflatable support means to allowing pivoting of the elongate members once an aircraft is received upon the upper surface. A specially constructed net and inflatable bag can also be provided on the forward end of the base of the device for stopping the forward progress of an aircraft. The device is powered by an electric motor which is radio controlled to allow remote control of the speed and direction of the landing device.

Additional objects, features and advantages will be apparent in the written description which follows.

BRIEF DESCRIPTION OF THE DRAWINGS

FIG. 1 is a side, perspective view of the landing device of the invention.

FIG. 2 is a top, perspective view of the landing device of FIG. 1.

DETAILED DESCRIPTION OF THE INVENTION

Figure 3:
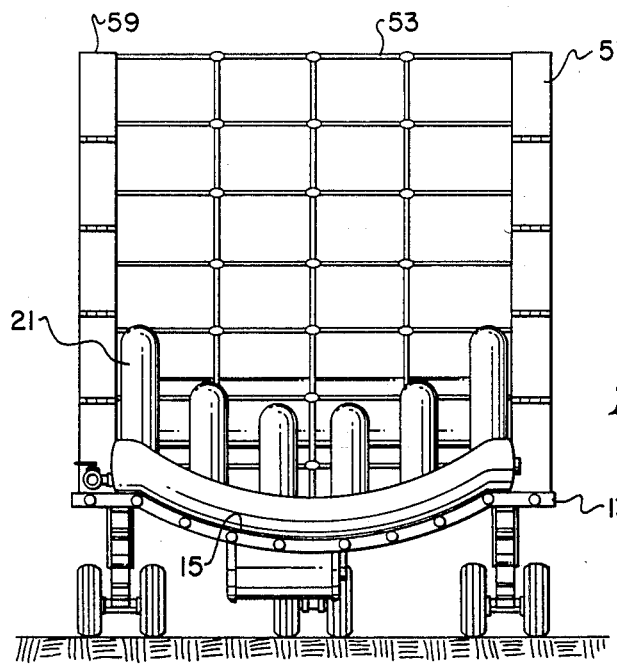
FIG. 3 is a rear view of the landing device of FIG. 1.

FIG. 1 shows an emergency aircraft landing device of the invention designated generally as 11. The landing device 11 includes a base 13 having a concave upper surface 15 (FIG. 3) and having a length 17 (FIG. 2) which is greater than its width 19 for receiving and supporting the fuselage of an aircraft. One problem with previous devices was the requirement that the pilot land upon a very short base. The length of the present base 13 is preferably at least twice the length of the aircraft being received. The actual length would vary, depending upon the type of aircraft for which the sled was intended. However, a general length could be estimated depending upon the application, e.g. a smaller sled could be utilized at a small airport where the aircraft were primarily private planes having two to ten passengers. In a larger airport, servicing jet passenger aircraft, a much longer base would be required.

Figures 4, 5:
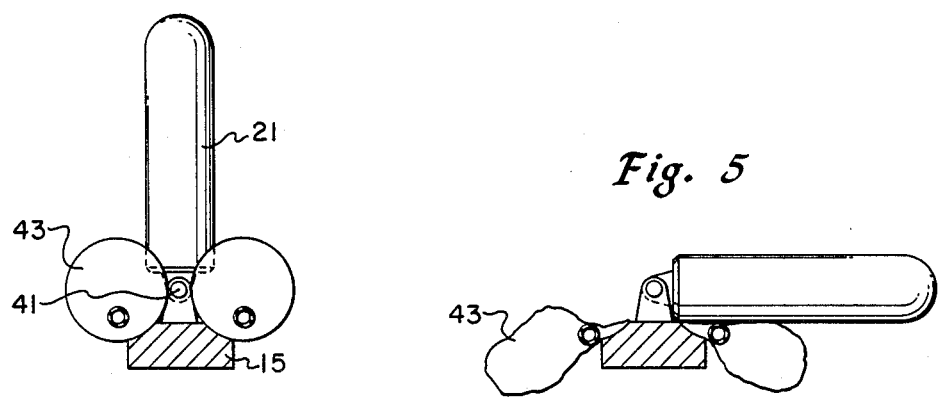
FIG. 4 is a side, isolated view of the elongate members and inflatable support means of the invention.
FIG. 5 is a side, isolated view similar to FIG. 4, with the support means collapsed.

A plurality of resilient, elongate members 21 (FIG. 1) are arranged in rows at spaced intervals along the upper surface 15. These rows are designated 23-39 in FIG. 2 for ease of illustration. Each row, e.g. row 23, is provided with six elongate members 21. The resilient elongate members 21 are preferably formed as solid, elastomeric fingers which, as shown in FIGS. 4 and 5, are pivotally mounted at a pivot point 41 on the surface 15 of the base.

An inflatable support means 43 is provided on either side of each of the rows 25-39 for supporting the elongate members 21 generally normal to the plane of the upper surface 15. These support means 43 can comprise inflatable rubber bags, each of which includes an in-valve 45 for connecting the bag through a suitable conduit 47 to a source of gas pressure. The gas pressure source can comprise, for instance, a fitting 51 for connection to a conventional air compressor (not shown). Each rubber bag also includes an out-valve 46. As shown in FIG. 5, the out-valve 46 can be opened to collapse the inflatable support means 43 after an aircraft has been received upon the upper surface 15.

The base 13 can be provided with top and end lights 50, 52 for increased visability. In addition to the elongate members 21, the upper surface of the base can be provided with a net (53 in FIGS. 2 and 3) and an inflatable bag (55 in FIG. 2) for stopping the forward progress of an aircraft landing on the upper surface 15.

Figure 6:
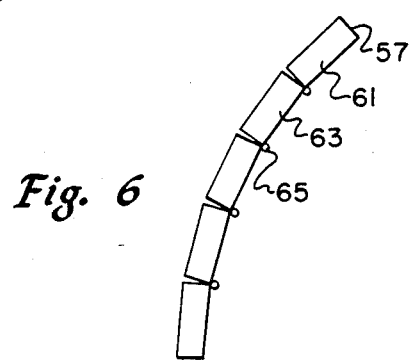
FIG. 6 is a side, isolated view of the net which is mounted upon the base of the landing device.
Figure 7:
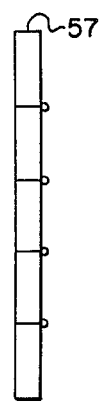
FIG. 7 is a side view of the net of FIG. 6 in the fully upright position.

As shown in FIGS. 3, 6 and 7, the net 53 is mounted between upright members 57, 59 on the base 13 at a forward end of the base for receiving the nose region of an aircraft during landing. As shown in FIGS. 6 and 7, the upright members 57, 59 are preferably formed from a resilient material in segments, the segments (e.g., 61, 63) being joined by elastic hinges 65 so that each of the upright members 57 normally assumes an accurate shape. As shown in FIG. 1 and FIG. 7, a cable 67 is secured at one end 69 to the base and is secured to an outer extent of the net 53 at an opposite end 71 to bias the upright members toward an upright position.

The inflatable bag 55 is also provided with an in-valve 73 (FIG. 2) for connection through the conduit 47 to the source of gas pressure 51.

As shown in FIG. 1, the base 13 has a pair of wheels 77, 79 mounted on either side of the base 13 for supporting the rear region of the device and a pair of front wheels 81 which are carried upon a front wheel strut 83. The rear wheels 77, 79 and centrally located front wheels 81 allow the base to roll down an airport runway without the need for specially designed conveyors or roller surfaces.

Figure 8:
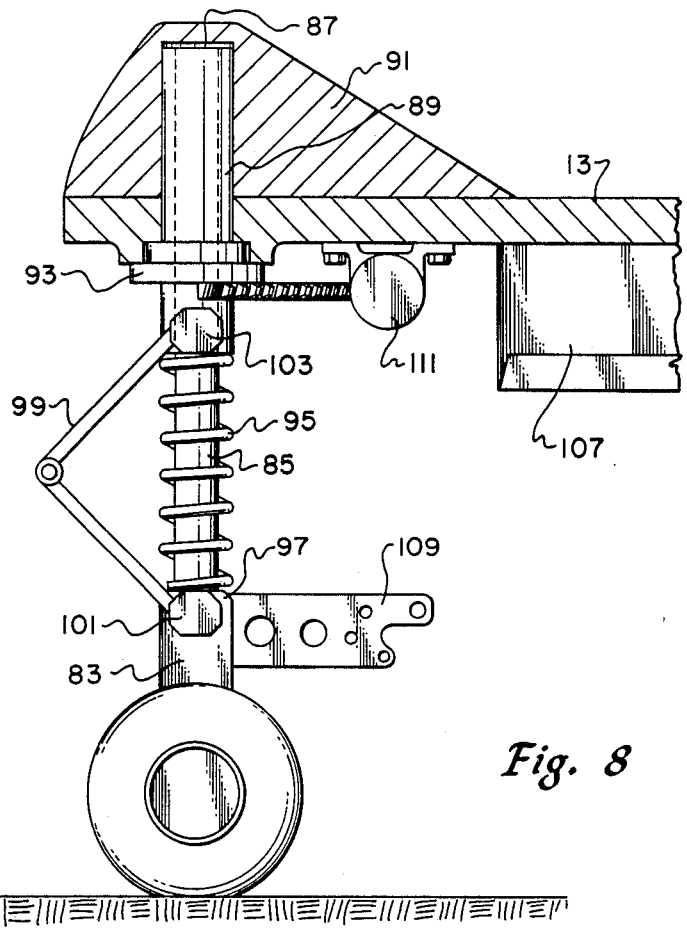
FIG. 8 is a side, isolated view of the front wheel of the landing device of FIG. 1.

As shown in FIG. 8, the front wheel strut 83 includes a shaft 85 having an upper end 87 which is received within a collar 89 provided in a solid portion 91 of the base 13. A bearing race 93 and conventional ball bearings (not shown) allow the shaft 85 to rotate about a vertical axis within the collar 89. A coiled spring 95 separates the collar 89 from the lower portion 97 of the wheel strut and acts as a shock absorber. A hinge assembly 99 is connected at one end 101 to the strut lower portion 97 and at an opposite end 103 to the collar 89, so that rotation of the collar 89 will result in rotation of the lower portion 97 about the vertical axis.

The landing device 11 is powered by an electric motor 105 (FIG. 1) which is powered by a battery 107 and which is mounted on a wheel bracket 109. The motor 105 includes suitable gearing (not shown) for driving the front wheels 81.

Figure 9:
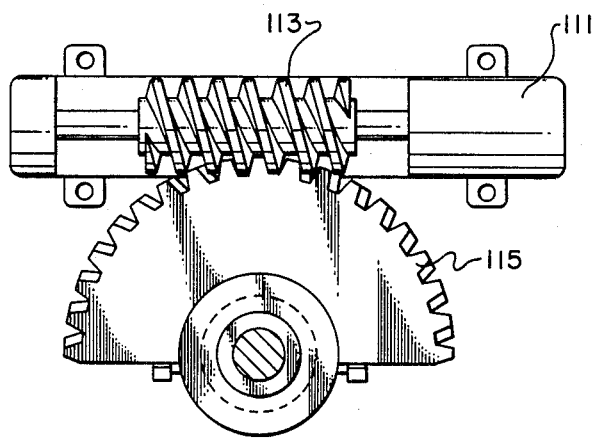
FIG. 9 is a top, isolated view of a portion of the front wheel of FIG. 8.

As shown in FIGS. 8 and 9, a second electric motor 111 is mounted beneath the base 13 and drives a worm gear (113 in FIG. 9). The worm gear is arranged to engage a gear surface 115 which is mounted on the collar 89 for driving the collar about a vertical axis of rotation.

The electric motor 111 is preferably provided with a remote control, such as a radio controller for providing a signal to an antenna 117 for actuating the motor 111. In this way, the motor 111 can be remotely actuated to rotate the strut 83 and orient the front wheels 81 to control the direction of travel of the landing device 11.

The motor 105 can also be remotely controlled to control the speed of the sled and a remotely controlled brake mechanism on the rear wheels 77, 79 can be used to stop the sled.

The operation of the device will now be described. Upon notification of an emergency landing, the selected runway would be cleared and the electric motor 105 would be actuated to propel the device down the runway. As the device gains speed, the aircraft would descent over the device and attempt to land on the concave upper surface 15 as the speed of the device approaches that of the aircraft. The direction of the landing device would be controlled remotely through the motor 111 and worm gear 113, and the speed of the device would be controlled through motor 105 as has been described. After the aircraft is received upon the upper surface 15, the inflatable support means 43 can be collapsed to allow the aircraft doors to open.

An invention has been provided with several advantages. The landing device of the invention is not tied to a tract or dedicated runway. The concave shape of the support surface is adapted to support an aircraft without tipping and without requiring complicated wing supports. The large landing area provides a greater margin of error to facilitate the emergency landing. The inflatable supports and rubber fingers prevent electric arking or spark discharge during landing of the aircraft and the support means can be collasped to allow passenger doors to open after the aircraft is received. Because the device is powered by an electric motor, there are no hazardous fuels which could contribute to an explosion. The net and inflatable bag in the forward end of the device provide additional stopping powers in case the speed of the aircraft and speed of the sled are not synchronized.

I claim:

1. An emergency aircraft landing device, comprising:
   a base having a concave upper surface and a length which is greater than its width for receiving and supporting the fuselage of an aircraft;
   a plurality of resilient, elongate members arranged in rows at spaced intervals along said upper surface, said rows being oriented normal to the length of said upper surface for stopping the forward progress of an aircraft landing on said upper surface;
   an inflatable support means on either side of each of said rows of said elongate members for supporting said elongate members generally normal to the plane of said upper surface;
   wheel means mounted on said base for allowing said base to roll down an airport runway; and
   propulsion means for propelling said base on said runway.

2. The emergency aircraft landing device of claim 1, wherein said resilient, elongate members are solid, elastomeric fingers which are pivotally mounted on said base.

3. The emergency aircraft landing device of claim 1, further comprising valve means for collapsing said inflatable support means to allow pivoting of said elongate members once an aircraft is received upon said upper surface.

4. An emergency aircraft landing device, comprising:
   a base having a concave upper surface and a length which is greater than its width for receiving and supporting the fuselage of an aircraft.

a plurality of resilient, elongate members arranged in rows at spaced intervals along said upper surface, said rows being oriented normal to the length of said upper surface for stopping the forward progress of an aircraft landing on said upper surface;

an inflatable support means on either side of each of said rows of said elongate members for supporting said elongate members generally normal to the plane of said upper surface;

a net mounted between upright members on said upper surface at a forward end of said base for receiving the nose region of an aircraft during landing;

an inflatable bag mounted in the forward end of said base adjacent said net for receiving said aircraft nose;

a pair of rear wheels and a centrally located front wheel mounted on said base for allowing said base to roll down an airport runway; and an electric motor associated with said front wheel for propelling said base on said runway.

5. The emergency aircraft landing device of claim 4, wherein said front wheel has a wheel strut which is rotatably mounted within a bearing assembly on said base, whereby the orientation of said strut controls the direction of travel of said landing device.

6. The emergency aircraft landing device of claim 5, further comprising a gear surface on said strut and a worm gear mounted on said base and being engagable with said gear surface for driving said surface about an axis of rotation, said worm gear being driven by an electric motor mounted on said base to rotate said strut and orient said front wheel to control the direction of travel of said landing device.

7. The emergency aircraft landing device of claim 4, wherein said net upright members are formed from a resilient material in segments, the segments in each of the uprights being joined by elastic hinges so that each of said upright members normally assumes an arcuate shape; and wherein said emergency aircraft landing device further comprises a cable secured at one end to said base and secured to an outer extent of said net at an opposite end to bias said upright members toward an upright position.

8. The emergency aircraft landing device of claim 6, further comprising a remote control device associated with said strut electric motor to selectively actuate said motor to drive said worm gear and thereby control the direction of travel of said landing device.

* * * * *